March 25, 1952 B. LIPPEL 2,590,110

SYSTEM FOR PRODUCING AN ENCODING DEVICE

Filed April 3, 1951 3 Sheets-Sheet 1

INVENTOR.
BERNARD LIPPEL

BY Harry M. Saragovitz
Attorney

March 25, 1952 B. LIPPEL 2,590,110

SYSTEM FOR PRODUCING AN ENCODING DEVICE

Filed April 3, 1951 3 Sheets-Sheet 2

INVENTOR.
BERNARD LIPPEL

BY Harry M. Saragovitz
Attorney

March 25, 1952 B. LIPPEL 2,590,110

SYSTEM FOR PRODUCING AN ENCODING DEVICE

Filed April 3, 1951 3 Sheets-Sheet 3

INVENTOR.
BERNARD LIPPEL
BY Harry M. Saragovitz
Attorney

Patented Mar. 25, 1952

2,590,110

UNITED STATES PATENT OFFICE 2,590,110

SYSTEM FOR PRODUCING AN ENCODING DEVICE

Bernard Lippel, Red Bank, N. J., assignor to the United States of America as represented by the Secretary of the Army Application April 3, 1951, Serial No. 219,102

13 Claims. (Cl. 177—380)

Figure 1:
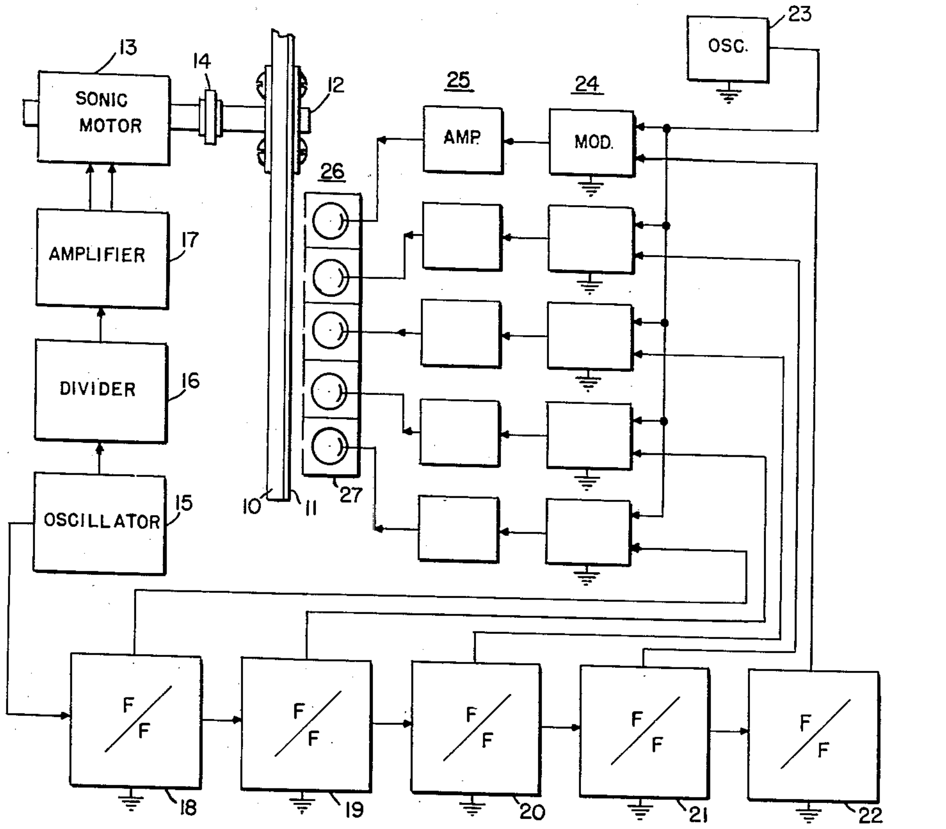

(Granted under the act of March 3, 1883, as amended April 30, 1928; 370 O. G. 757)

The invention described herein may be manufactured and used by or for the Government for governmental purposes, without the payment of any royalty thereon.

This invention relates to a system for producing a coding device for use in a data transmission system and in its broadest aspect the invention relates to an electrical system for dividing a disk or drum into aliquot sectors or parts. In particular, the invention relates to a system for producing a code record device such as a disk or drum having distributed thereon commutating elements arranged to quantize the angular displacement of the device in accordance with a binary number code.

Heretofore, coding wheels for use with brush commutators or with photoelectric pickup devices have ordinarily been produced by mechanical processes involving the use of a dividing engine or some similar device for engraving or otherwise producing commutating segments which divide the circle into aliquot parts. These methods are generally expensive and tedious and require instruments of great precision to produce the code record devices.

It is, accordingly, an object of the present invention to provide an electrical system for dividing a rotatable member into aliquot sectors or parts. It is, likewise, an object of the present invention to produce a coding device having commutating elements by an improved method and with improved apparatus in a manner which avoids many of the disadvantages and limitations of prior art methods.

It is also an object of the present invention to produce a coding device having commutating elements corresponding to a binary number code by combined electronic and photographic means.

It is a particular object of the present invention to produce, by photo-recording a coding wheel carrying commutating elements for producing digit signals of binary numbers wherein the number of digits in the code number groups is very large as compared with what can be achieved by prior art methods.

In accordance with the broadest aspect of this invention, there is provided a system for dividing a surface of revolution into aliquot parts comprising a surface of revolution rotatable about its axis and an index member in operative relation thereto and a source of reference frequency. Means operatively controlled by the source of reference frequency are provided for rotating the surface uniformly and at a chosen frequency which is a sub-multiple of the reference frequency. Also provided are means for electrically producing energy having a fundamental frequency which is a chosen sub-multiple of the reference freqency and equal to or higher than the first mentioned sub-multiple frequency together with means comprising the index member operatively controlled by the last mentioned frequency for marking the surface at time intervals which divide the surface into aliquot parts.

Also in accordance with the present invention there is provided apparatus for producing a coding device having commutating elements corresponding to a binary number code comprising a recording member rotatable about an axis and having a photosensitized surface of revolution. Also provided are means for photo-recording the commutating elements on the photo surface comprising a binary counter circuit having a plurality of multivibrator stages, an output circuit coupling from each of the stages to a corresponding plurality of light sources to provide in each case a square wave commutating potential for each source and means synchronously relating the rotation of the recording device and the operation of the counter circuit for utilizing the sources of light to record said elements on said surface in accordance with a binary number code.

Also, in accordance with the invention a method for producing a coding wheel having commutating elements corresponding to a binary number code comprises generating a plurality of potentials of square wave form, said potentials being related in frequency in accordance with a binary number code, commutating a plurality of light sources each with one of said square wave potentials, rotating said record device at a rate synchronous with the lowest frequency of said potentials of square wave form and utilizing said plurality of light sources photographically to record said commutating elements on said device.

For a better understanding of the invention, together with other and further objects thereof, reference is had to the following description taken in connection with the accompanying drawings, and its scope will be pointed out in the appended claims.

Figure 2:
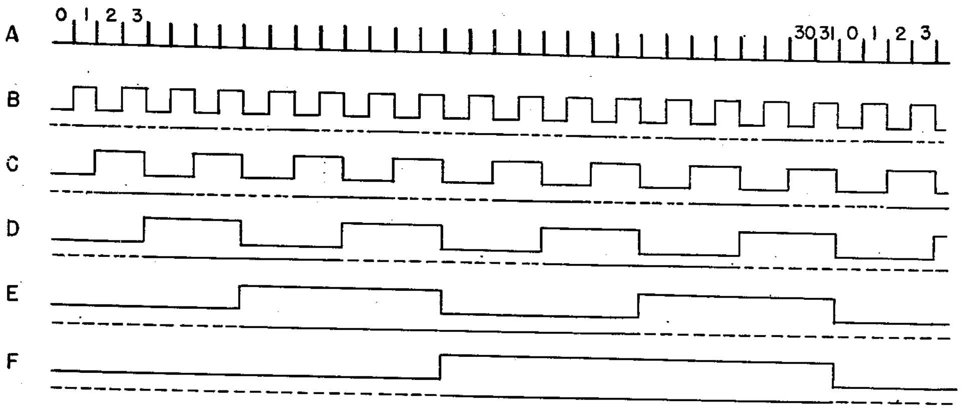
Figure 3:
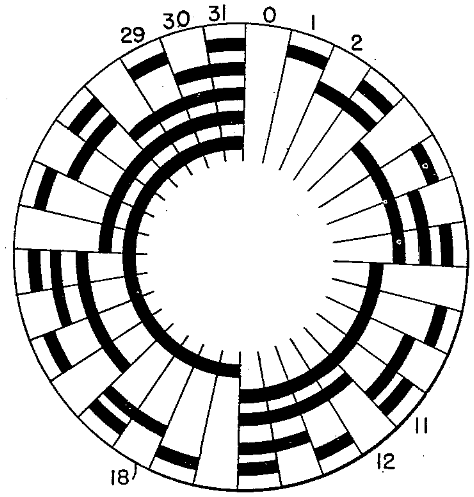
Figure 4:
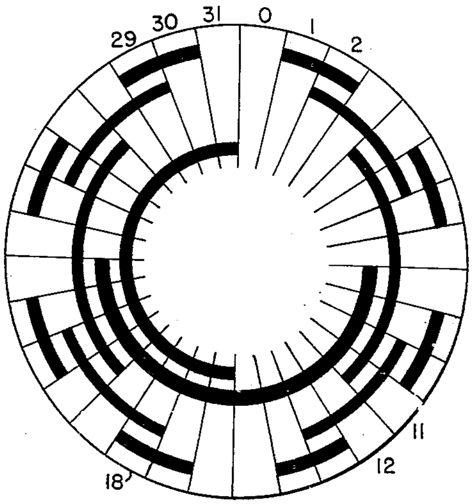
Figure 5:
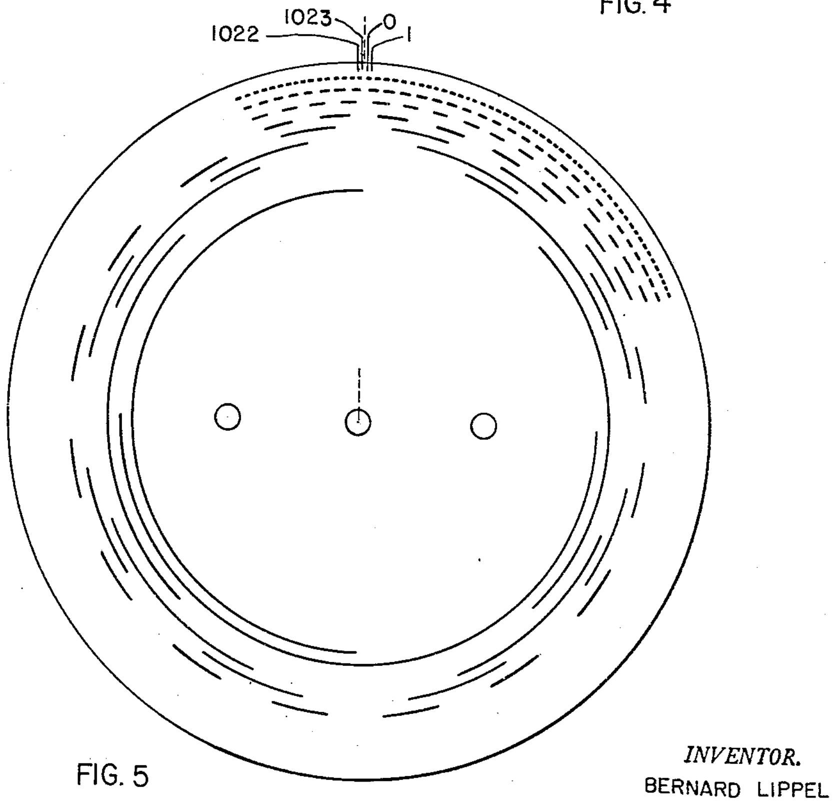
Figure 6:
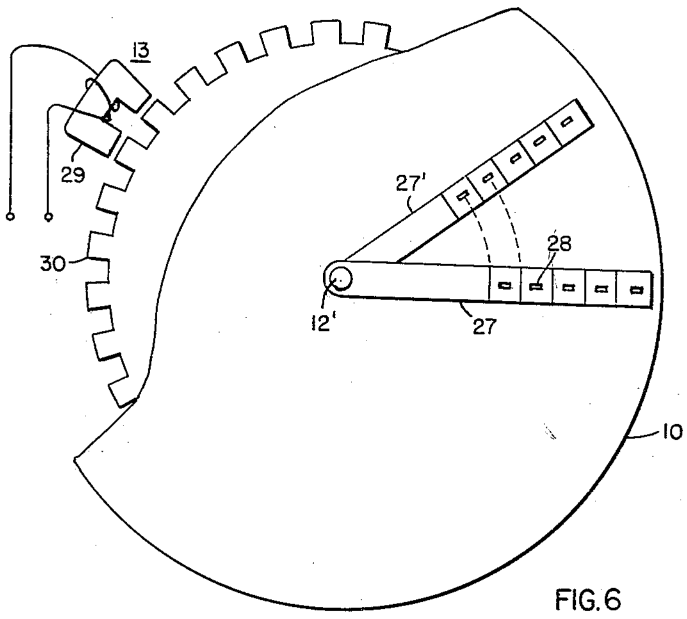
Figure 7:
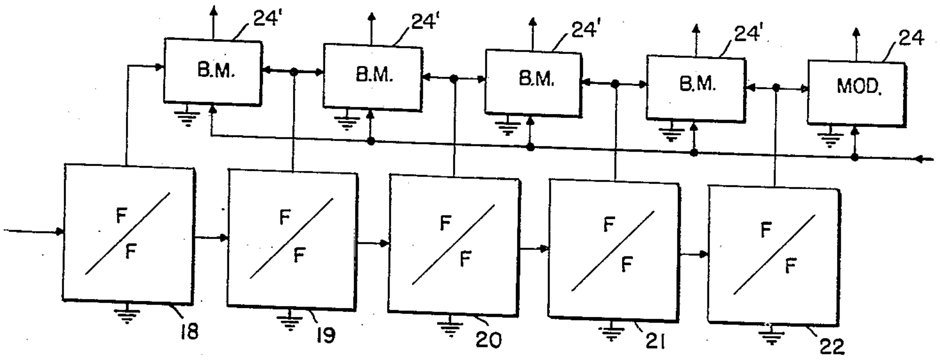
Figure 8:
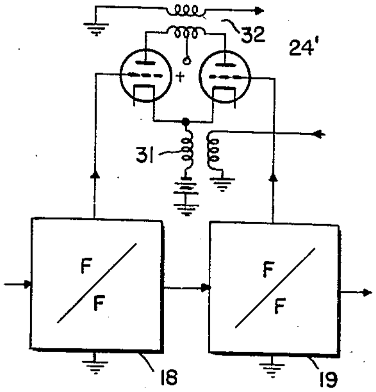

In the drawing, Fig. 1 illustrates a preferred embodiment of the invention for photographically recording commutating elements on a disk type coding wheel; Fig. 2 illustrates a plurality of wave forms for use in explaining the operation of the system; Figs. 3 and 4 illustrate code wheels having commutating segments for five digit numbers in standard binary and cyclic binary code, respectively; Fig. 5 shows a code record wheel for 10 digit numbers in cyclic binary code; Fig. 6 illustrates a mechanical arrangement of a part of the apparatus; Fig. 7 illustrates a portion of the binary counter circuit of Fig. 1 modified to generate square wave forms in cyclic binary code and Fig. 8 illustrates a balanced modulator arrangement suitable for use in the Fig. 4 arrangement.

Referring now more particularly to Fig. 1, a code record wheel 10, having a photosensitive surface 11, is mounted to rotate on shaft 12 by means of a sonic motor 13 to which 12 is attached by a coupling 14. The sonic motor 13 is a convenient form of synchronous motor having a large number of poles, but any form of synchronous motor may be employed. A reference frequency oscillator 15 is coupled to a divider circuit 16, the output of which is coupled to an amplifier 17 and the output of 17 is coupled to the input of the sonic motor 13. An output of 15 is also coupled to the input of the first stage 18 of a multivibrator counter circuit consisting of the cascaded multivibrator stages or flip-flop units 18, 19, 20, 21 and 22. A corresponding plurality of flash lamps collectively labeled 26 are shown, each enclosed in a compartment of an indexing unit 27, which unit is located adjacent the photosensitive surface 11, with the apertures for transmitting light from each flash tube in radial alignment. Each of the tubes 26 is coupled to a corresponding multivibrator unit via a modulator of the plurality collectively labeled 25. An output from a high frequency oscillator 23 is coupled to an input of each of the modulators 24. The high frequency output on unit 23 is, therefore, keyed in each case in accordance with a square wave form potential and is applied to a flash lamp 26.

Referring to Fig. 6, the disk 10 is illustrated with a broken section to permit a view of elements of the sonic motor 13. The elements of the motor 13 are shown as a stator 29, energized by a winding to which the output of amplifier 17 in Fig. 1 is connected. The rotor labeled 30 is shown as having a plurality of teeth so that the speed of rotation will be at the frequency applied to the winding of stator 29 divided by the number of teeth. Accordingly, the disk 10 will rotate at a frequency which is a sub-multiple of the frequency applied by amplifier 17. The division accomplished in unit 16 of Fig. 1 will be chosen in relation to the number of teeth of rotor 30, so that the rotation is at the frequency of the square wave output of multivibrator stage 22.

The index head 27 of Fig. 1 is shown in plan view in Fig. 6, as supported by a stud 12′ which is axially aligned with the shaft 12. The plurality of apertures in the index head are shown as slots 28 within each compartment and it will be understood that in each of the compartments there will be located one of the flash lamps 26.

For purposes of illustration, the arrangement has been shown with five lamps and five multivibrator stages to illustrate the recording of digit signal elements for a five digit standard binary number code. The operation will be clear if we consider the potential wave forms of Fig. 2 which represent voltage output plotted against time. These outputs will be considered as having positive and zero voltage levels. Thus, waveform A shows a pulse output from oscillator 15 which is recurrent at a chosen repetition rate. This output, when applied to the multivibrator stage 18, produces a voltage output of the form shown at B, which is applied to a modulator 24 and to the following stage 19. Each of the multivibrator or flip-flop units of the binary counter chain divide the input wave by two, so that the successive outputs from units 19, 20, 21 and 22, which are applied to corresponding modulators 24, have the square wave forms shown at C, D, E and F, respectively.

The record produced by exposing and later developing the photo-sensitive surface 11 of disk 10 is shown, together with sector divisions which would not appear upon the completed disk, in the drawing, Fig. 3. It will be evident that the voltage lamp 26 which exposes the photo surface 11 in the manner shown in the ring of shortest radius will produce an exposed strip as shown in Fig. 3 which precisely starts and finishes in an arc of 180°, since the wheel 10, as has been above stated, rotates at the frequency of the output of unit 22. Since the output of 22 is of square wave form, an exposure occurs during one-half of the cycle and so produces a commutating arc of 180°. In similar fashion it will be seen that successive commutating rings which are produced by the exposures of the flash lamps corresponding to subsequent digits of the binary code produce the segment markings in rings as shown in Fig. 3 and a comparison of the 32 sectors in Fig. 3 will be seen to correspond with the square wave forms of Fig. 2. Accordingly, in each revolution of the disk 10, the appropriate exposures are produced by the flash lamps 26 controlled by the corresponding stages of the binary counter circuit. It will be clear that this operation may be performed at high speed by arranging with switching, not shown, to open the circuits to the flash lamps and permit the motor to run at a stabilized speed and thereafter connect the lamps in circuit since it is not necessary that the exposures be made during a single rotation of the disk 10, but may be made continuously for as long as is desired.

As has been mentioned above, the sonic motor is a form of synchronous motor having a large number of poles and the rotational speed will be the input frequency divided by the number of poles or teeth as shown in Fig. 6. In order that the motor shall run at a uniform rate and not have small variations or ripples in the speed of rotation such as, for example, might be caused by a slight variation corresponding to the number of teeth, it is desirable to provide between the sonic motor 13 and the shaft 12 a flexible coupling 14 and to make the wheel or disk 10 of a material such as to provide a suitable mass. In place of providing the mass in the wheel 10, an auxiliary balance wheel may be employed and mounted on the shaft 12. The combination of a suitable flexible coupling 14 and the mass of a suitable balance wheel constitute a mechanical low pass filter for coupling the coding surface to the motor 13 to eliminate variations in the frequency of rotation.

The code record may then be developed either as a positive, whereby the sectors become transparent on an opaque background, or the disk may be used as a negative to produce any number of positives. In the system described in copending application Ser. No. 219,103, filed in the names of Bernard Lippel et al., and assigned to the same assignee, the Government of the United States, the use of the disk is described more completely and a positive desk is employed. Briefly, the flash lamps are replaced by photocell pick-up elements and light flashing at a chosen rate is transmitted through the disk 10, which is of transparent material. The coating 11 is opaque except for the commutating segments which pass light to the photocells for producing digit signals of a binary number corresponding to the sector which is being sampled.

It will be clear that in practice, a much larger binary number than one of five digits will ordinarily be desired. To this end, the number of compartments in the member 27 may be greatly increased. This can be done by using a relatively large disk or, as has been found desirable in practice, to employ optical means in connection with the member 27, to conduct light from the lamps 26 to the apertures 28, permitting the lamps themselves to be more widely spaced.

An alternative arrangement is to stagger the recording and, conversely, the reproducing of the digit code signals by employing a second index arm labeled 27' in Fig. 6 having the apertures spaced radially midway between those of the first index member 27. It will be clear, of course, that the width of the recorded segments should be made narrow enough so that adjacent rings of commutating segments do not overlap. It should also be borne in mind that if the recording is made with two index heads 27 and 27' spaced at an arbitrary angle, as shown, then the same form of pickup elements arranged in two index arms spaced at the same angle must be employed in reproducing the digit signals. A further alternative is to use only one lamp and expose only one zone or ring at a time, disconnecting and moving the lamp between exposures, but not stopping the motor or the electronic equipment.

As has been pointed out in the aforementioned pending application, the standard binary code illustrated in Fig. 3 has the disadvantage that the radial alignment of the pickup elements must be very precise since a slight error in alignment may cause a reading to be taken which crosses over the line of contiguous sectors. The standard binary code is such that a large number of digits may change between contiguous sectors. For example, between the sectors 15 and 16 all digit signals will change. For this reason it is often preferable to employ a wheel coded in cyclic binary code and elsewhere in the system to translate the cylic binary code to standard binary code. The arrangement of Fig. 7 illustrates a form of cyclic binary counter circuit which may be employed for directly recording the commutating segments in cyclic binary code and is a modified arrangement of the binary counter shown in Fig. 1. Thus, in Fig. 7, the binary counter is shown as before comprised of multivibrator stages 18, 19, 20, 21 and 22, but replacing the group of modulators of Fig. 1 balanced modulators labeled 24' are employed in the first 4 positions.

Fig. 4 illustrates in a manner similar to Fig. 3, the record wheel coded for cyclic binary numbers. It will be observed that the digit signals between any contiguous sectors throughout the entire 360° of the circle never change by more than one digit. Accordingly, a slight inaccuracy of alignment of the index head can not cause an error in excess of one sector division. Referring to Fig. 2, the cyclic code is illustrated by solid and dotted line intervals corresponding to maximum or positive output and minimum or zero output, respectively. Thus, between the wave forms A and B, the square wave voltage output of balanced modulator 24' is indicated as positive for the solid line portion and zero for the dotted line portion. Similarly, the outputs of the successive balanced modulator units 24' are shown by the similar square wave output indicated between the wave forms C and D, D and E, and E and F, respectively. A conventional modulator 24 applies the unmodified output from stage 22 to the inner ring flash lamp 26 and this output is indicated below the wave form F by solid and dotted line, so that the five cyclic coded wave forms are thus indicated and may be compared with the commutating segments or exposed portions of the code wheel shown in Fig. 4.

In Fig. 3, as will have been noted, the intervals are labeled zero–31 to indicate that 32 different combinations are provided after which the cycles are repeated. Considering now the cyclic wave form output between wave forms B and C, it will be noted that when there is zero output from both B and C, or when the output of both B and C is positive, there is no output from the balanced modulator 24. For example, this is the case during intervals zero, 3, 4, 7, 8, etc. Conversely, when there is output from only stage 18, or from only stage 19, output is obtained from balanced modulator 24'. The same condition is true for the other balanced modulator stages. It would be clear, therefore, that to obtain such an output for cyclic code, it must be obtained differentially from adjacent stages 18, 19 and also 19, 20 and 21, 22. For this purpose the balanced modulator is employed and it may be conveniently arranged as shown in Fig. 8, where the modulator circuit is shown schematically in connection with the outputs of stages 18 and 19.

In the arrangement of Fig. 8, the high frequency voltage from oscillator 23 is coupled additively to the inputs of two electron triodes via transformer 31 while the outputs from stages 18 and 19 are coupled differentially to the inputs of these tubes. The output of the balanced modulator stage is coupled via transformer 32 to an input of an amplifier 25 and this coupling is subtractive. In operation, then, high frequency output is supplied at the secondary winding of transformer 32, when there is an output from stage 18 and no output from stage 19 and vice-versa. When, however, there is no output from stages 18 and 19, or when there is output from both stages 18 and 19, there is no output supplied to the secondary of transformer 32. It will be clear, therefore, that the high frequency output of the modulator stages 24' and 24 of Figs. 7, applied to the amplifiers 25 as in Fig. 1, which in turn excite the flash lamps 26, cause these lamps to expose the photosensitive surface 11 in accordance with the cyclic binary code to produce a coded record wheel of the form shown in Fig. 4.

Fig. 5 illustrates a ten-digit wheel coded in cyclic binary code in accordance with the present invention and it will be evident from this drawing that where a large number of digits are to be employed, the photographic method of producing the coding commutator segments is a precise and simple method for quickly and economically manufacturing the wheel.

In practice, the photographic process is of advantage in making a large number of identical coding wheels. The photographic coating for operating in this manner would be the ordinary photographic negative emulsion coated on a transparent disk 10 so that the master record so produced would be a negative and from it any number of positive code wheels can be reproduced.

The invention thus far described has been for the specific purpose of producing a code record wheel for use in a data transmission system employing pulse code modulation. In its broadest aspect, the invention relates to an electromechanical arrangement for dividing a surface of revolution into aliquot parts. Ordinarily, a dividing engine or some precision mechanical dividing equipment would be necessary to divide a surface into a large number of aliquot parts. The present invention can, however, very readily divide such a surface by means of the technique described. For example, instead of the dividing chain shown in Fig. 1, where flip-flop units are employed and the division is always an even sub-multiple of the rotational rate, any type of electronic dividing system may be employed to divide the rotational rate by either an even or an odd number. The output frequency of the divider need not be of square wave form, but it can be made, by means of well known filtering circuits or differentiating circuits, to be a sharp narrow pulse of fundamental frequency corresponding to the divided frequency. This output pulse may be caused to operate a flash lamp or to actuate some type of marker to mark upon the rotating surface a narrow line corresponding to each pulse so that the surface is divided by radial lines into aliquot sectors in accordance with the frequency division which has been chosen.

While the arrangement described has been shown as a record disk, it will be evident that the surface to be divided or to be recorded with commutating elements may be the surface of a drum which is to be divided into segments, or it may be the surface of a cone or some other surface of revolution for which an aliquot division is desired.

In the arrangement of Fig. 1, a separate divider 16 has been shown for supplying energy of suitable frequency to motor 13. It will be evident that the circuit can, in most cases, be simplified by omitting unit 16 and connecting amplifier 17 directly to an output of one of the divider stages of the binary counter chain of suitable frequency.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A system for dividing a surface of revolution into aliquot parts comprising a surface of revolution rotatable about its axis and an index member in operative relation thereto, a source of reference frequency, means operatively controlled by said source for rotating said surface uniformly at a chosen frequency which is a sub-multiple of said reference frequency, means for electrically producing energy having a fundamental frequency which is a chosen sub-multiple of said reference frequency and higher than said first mentioned sub-multiple frequency and means comprising said index member operatively controlled by said last mentioned frequency for marking said surface at time intervals which divide said surface into aliquot parts.

2. A system in accordance with claim 1, wherein said means for rotating said surface uniformly comprises a synchronous motor and means rotationally coupling said surface with said motor comprising a mechanical low pass filter for eliminating variations in said frequency of rotation.

3. A system for dividing a surface of revolution into aliquot parts comprising a surface of revolution rotatable about its axis and an index member in operative relation thereto, a source of reference frequency, means operatively controlled by said source for rotating said surface uniformly at a chosen frequency which is a sub-multiple of said reference frequency, means for electrically producing energy of pulse wave form having a fundamental frequency which is a chosen sub-multiple of said reference frequency and higher than said first mentioned sub-multiple frequency and means comprising said index member operatively controlled by said energy of pulse wave form for marking said surface at time intervals which divide said surface into aliquot parts.

4. A system for dividing a surface of revolution into aliquot parts comprising a surface of revolution rotatable about its axis and an index member in operative relation thereto, a source of reference frequency, means operatively controlled by said source for rotating said surface uniformly at a chosen frequency which is a sub-multiple of said reference frequency, means for electrically producing energy of square wave form having a fundamental frequency which is a chosen sub-multiple of said reference frequency and equal to or higher than said first mentioned sub-multiple frequency and means comprising said index member operatively controlled by said energy of square wave form for marking said surface at time intervals to divide said surface into aliquot parts.

5. A system for dividing a surface of revolution into aliquot parts comprising a surface of revolution rotatable about its axis and an index member in operative relation thereto, a source of reference frequency, means operatively controlled by said source for rotating said surface uniformly at a chosen frequency which is a sub-multiple of said reference frequency, means comprising a divider circuit operatively controlled by said reference frequency for producing electrical energy having a fundamental frequency which is a chosen sub-multiple of said reference frequency and equal to or higher than said first mentioned sub-multiple frequency and means comprising said index member operatively controlled by said last mentioned frequency for marking said surface at time intervals to divide said surface into aliquot parts.

6. A system for producing an encoding device having commutating elements corresponding to a binary number code comprising a recording member rotatable about an axis and having a photosensitized surface of revolution, means for photorecording said elements on said surface comprising a binary counter circuit having a plurality of multivibrator stages, an output coupling from each of said stages to a source of light to provide in each case a square wave commutating potential for each said source and means synchronously relating the rotation of said recording member and the operation of said counter circuit for utilizing said sources of light to record said elements on said surface in accordance with a binary number code.

7. A system in accordance with claim 6, wherein said means synchronously relating the rotation includes a mechanical low pass filter for rotating said recording member.

8. Apparatus for producing an encoding device having commutating elements corresponding to the standard binary number code comprising a recording member rotatable about an axis and having a photosensitized surface of revolution, means for photo-recording said elements on said surface comprising a standard binary counter circuit having a plurality of multivibrator stages, an output coupling from each of said stages to a source of light to provide in each case a square wave commutating potential for each said source and means synchronously relating the rotation of said recording member and the operation of said counter circuit for utilizing said sources of light to record said standard binary code elements on said wheel.

9. Apparatus for producing an encoding device having commutating elements corresponding to the cyclic binary number code comprising a recording member rotatable about an axis and having a photosensitized surface of revolution, means for photo-recording said elements on said surface comprising a cyclic binary counter circuit having a plurality of multivibrator stages, an output coupling from each of said stages to a source of light to provide in each case a square wave commutating potential for each said source and means synchronously relating the rotation of said recording member and the operation of said counter circuit for utilizing said sources of light to record said cyclic binary code elements on said wheel.

10. Apparatus for producing a code wheel having commutating elements corresponding to the cyclic binary number code comprising a recording member rotatable about an axis and having a photosensitized surface of revolution, means for photo-recording said elements on said surface comprising a standard binary counter circuit having a plurality of multivibrator stages, differentially connected output couplings from each pair of adjacent stages and a single coupling from the last stage each to a source of light to provide in each case a square wave commutating potential for each said source, said square waves being related in accordance with the cyclic binary code and means synchronously relating the rotation of said recording member and the operation of said counter circuit for utilizing said sources of light to record said cyclic binary code elements on said wheel.

11. A method for producing a coding wheel having commutating elements corresponding to a binary number code which comprises generating a plurality of potentials of square wave form, said potentials being related in frequency in accordance with a binary number code, commutating a plurality of light sources each with a one of said square wave potentials, rotating said record device at a rate synchronous with the lowest frequency of said potentials of square wave form and utilizing said plurality of said light sources photographically to record said commutating elements on said surface.

12. A method for producing a coding wheel having commutating elements corresponding to the standard binary number code which comprises generating a plurality of potentials of square wave form, said potentials being related in frequency in accordance with the standard binary number code, commutating a plurality of light sources each with a one of said square wave potentials, rotating said record device at a rate synchronous with the lowest frequency of said potentials of square wave form and utilizing said plurality of said light sources photographically to record said commutating elements on said surface.

13. A method for producing a coding wheel having commutating elements corresponding to the cyclic binary number code which comprises generating a plurality of potentials of square wave form, said potentials being related in frequency in accordance with cyclic binary number code, commutating a plurality of light sources each with a one of said square wave potentials, rotating said record device at a rate synchronous with the lowest frequency of said potentials of square wave form and utilizing said plurality of said light sources photographically to record said commutating elements on said surface.

BERNARD LIPPEL.

REFERENCES CITED

The following references are of record in the file of this patent:

UNITED STATES PATENTS

| Number | Name | Date |
|---|---|---|
| 2,539,014 | Frantz | Jan. 23, 1951 |
| 2,556,586 | Johnston | June 12, 1951 |